United States Patent [19]

Brady

[11] 4,351,106
[45] Sep. 28, 1982

[54] BATTERY CELL ASSEMBLY SYSTEM AND METHOD

[76] Inventor: Allan O. Brady, 906 Bristol Rd., Yorkville, Ill. 60560

[21] Appl. No.: 179,649

[22] Filed: Aug. 20, 1980

[51] Int. Cl.³ .......................................... H01M 10/04
[52] U.S. Cl. .................................... 29/730; 29/623.2; 53/174
[58] Field of Search ................... 29/623.1, 623.2, 730; 164/DIG. 1; 53/171, 174, 540

[56] References Cited

U.S. PATENT DOCUMENTS

| | | | |
|---|---|---|---|
| 3,370,549 | 2/1968 | Livingston | 53/540 |
| 3,504,731 | 4/1970 | Farmer | 164/102 |
| 3,883,369 | 5/1975 | Badger et al. | 29/623.1 |
| 4,216,579 | 8/1980 | Murata et al. | 29/623.2 |

FOREIGN PATENT DOCUMENTS 1565928  4/1980  United Kingdom .................. 29/730

*Primary Examiner*—Francis S. Husar
*Assistant Examiner*—Jonathan L. Scherer
*Attorney, Agent, or Firm*—Gary, Juettner & Pyle

[57] ABSTRACT

A battery cell assembly system is characterized by an apparatus for automatically packaging battery plates in separator material, and for then positioning a plurality of the plates side by side in an open ended outer container of the cell to alternate negative and positive plates. The apparatus has a casting station whereat lugs on plates of like polarity are joined and posts added to the cell, and a sealing station at which a cover is placed on the open end of the container to complete the cell.

1 Claim, 4 Drawing Figures

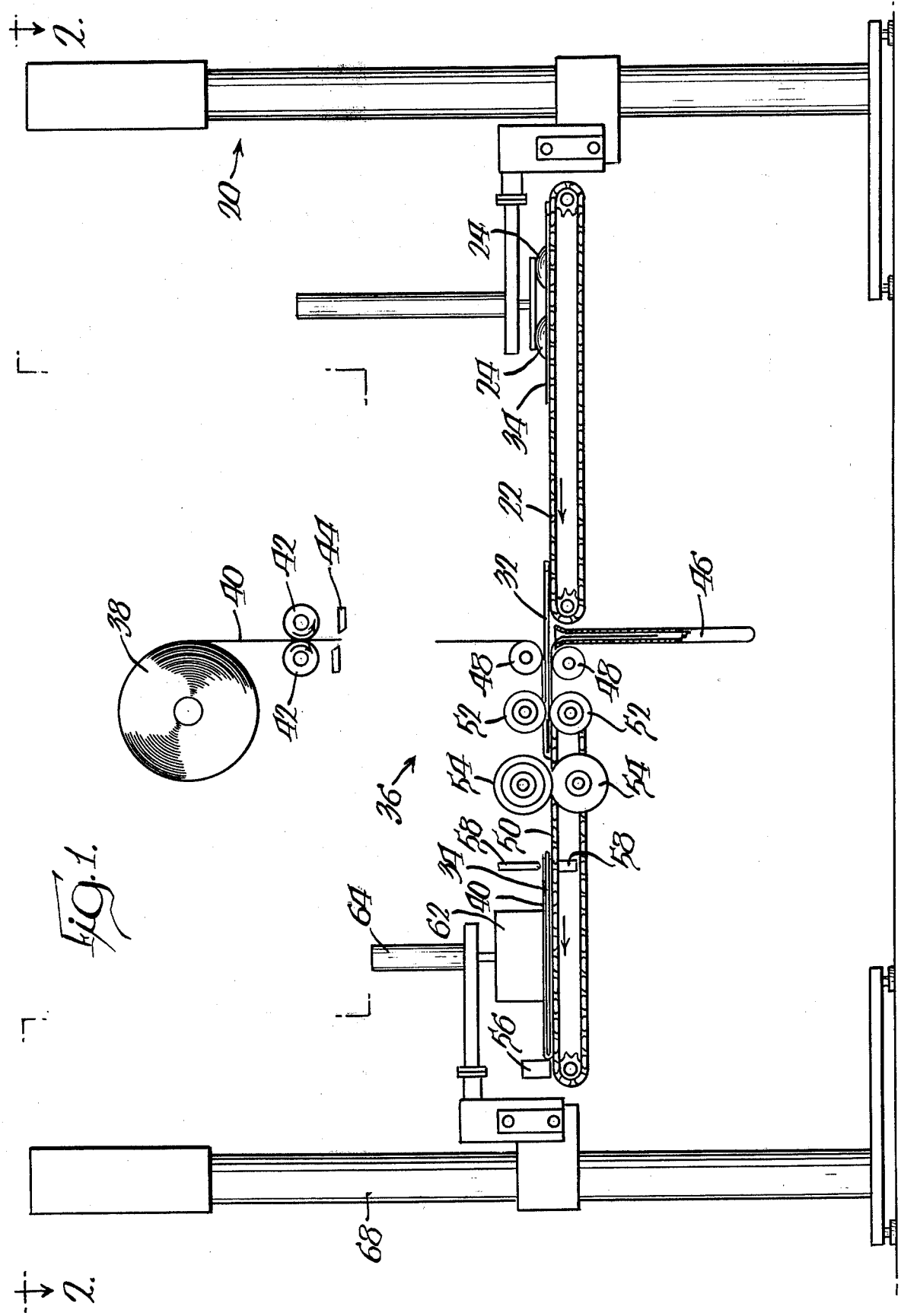

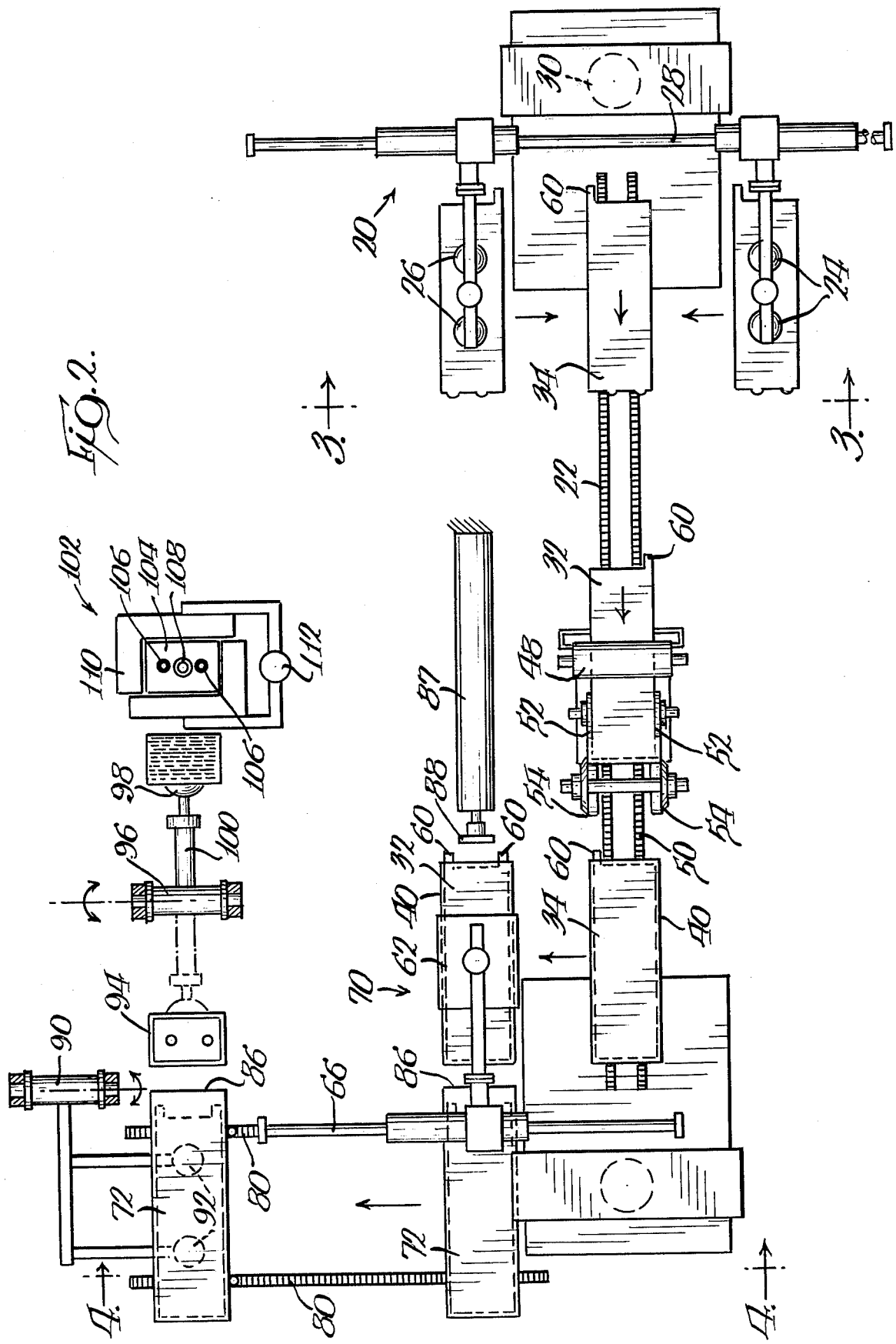

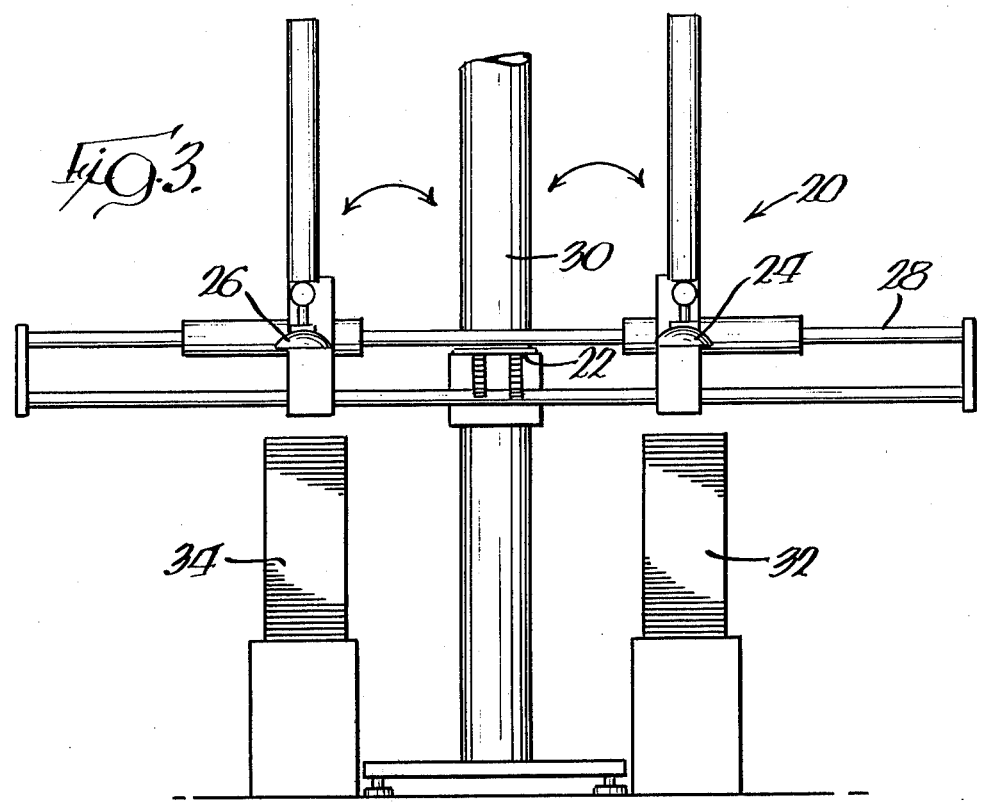
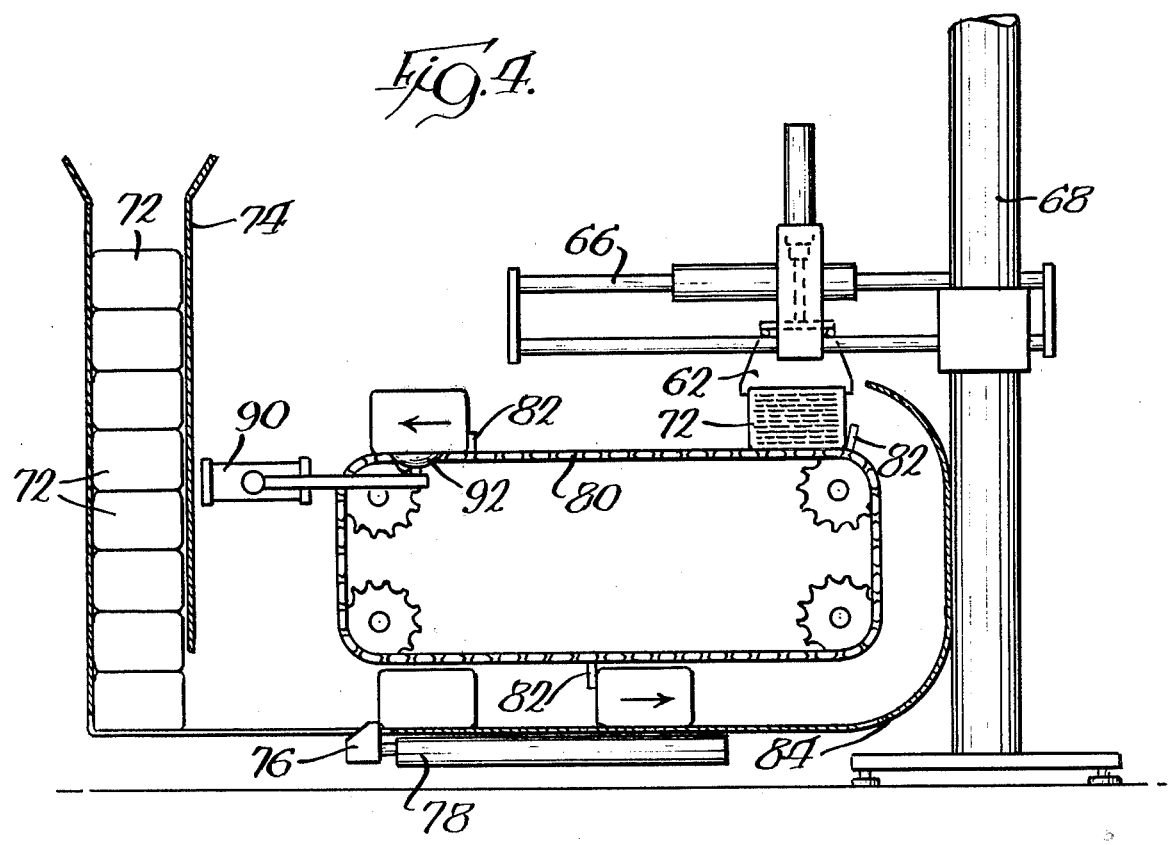

BATTERY CELL ASSEMBLY SYSTEM AND METHOD

BACKGROUND OF THE INVENTION

The present invention relates to a battery cell assembly system which automatically packages battery plates in separator material and assembles the packaged plates in a battery cell.

Battery plates for batteries of the lead-acid type are conventionally manufactured by casting a grid structure in a mold. The grid usually comprises a rectangular frame formed with openings, and a laterally projecting conductive lug on its periphery by means of which a plurality of grids of similar polarity may be fused together or otherwise electrically connected in parallel as by a bar leading to a battery post. The grid is coated with an active material paste of lead oxide containing some sulphuric acid, whereafter it is heated to dry and somewhat solidify the paste. The resulting structures, called battery plates, are then subjected to an electrical charge while in sulphuric acid, whereby one group of plates called the negative plates have their lead oxide converted to lead, and another group of plates called the positive plates have their lead oxide converted to lead dioxide.

To prevent shedding of the active material coating from the battery plates when the same are used in a battery, each plate is wrapped or encased in a separator material which ideally on the one hand securely retains the coating on the plate while on the other hand allows unimpeded electrochemical action of the plate when formed with one or more additional plates into a battery. Conventionally, each plate is wrapped in a separator material which is usually of fiberglass. To this end, a fiberglass mat is folded around the plate, and to hold the mat in position on and against the plate a plastic "foot" or sheet of material is folded around the bottom of the plate and mat, and an overlay sheet of perforated plastic is folded around the mat and foot lengthwise of the plate. Ends of the outer sheets of plastic material are then overlapped and joined, for example by heat sealing, to complete the assembly. The wrapping process is usually a manual operation inasmuch as the prior art does not contemplate any generally satisfactory means for automatically wrapping fiberglass around battery plates, and is quite undesirable since fiberglass is a relatively hazardous material to handle and work with.

A series of wrapped or packaged negative and positive plates are then interleaved to alternate negative and positive plates, whereupon the same may be placed in a container to form a battery cell. The cell may comprise any number of plates, with the positive plates being connected in parallel and the negative plates being connected in parallel, so that the entire cell has the desired average rating. A requisite number of cells may then be inserted into an outer housing of a battery, the cells connected in series, a cover installed on the housing and electrolyte introduced therein to complete the battery.

Manifestly, battery plate assemblies and the resulting batteries of the type described are difficult, time consuming and tedious to construct. It would therefore be very desirable to provide some means for automatically manufacturing battery cells, which cells may then be combined to form a battery.

OBJECT OF THE INVENTION

A primary object of the present invention is to provide a method of and an apparatus for automatically packaging battery plates in pouches of a separator material, and for then assembling a plurality of the packaged plates into a battery cell.

SUMMARY OF THE INVENTION

In accordance with the present invention, a system for assembling battery cells comprises means for supplying generally rectangular negative and positive battery plates in alternate succession to a plate packaging station, each plate having a conductive lug extending from one side thereof. Means are provided for packaging each plate in separator material with the plate lug extending outwardly of the material, and for placing the packaged plates side by side in an open ended container to alternate plates of negative and positive polarity and to position the lugs toward the open end of the container. Also included are means for electrically connecting the lugs of the negative plates in parallel and the lugs of the positive plates in parallel, and for placing a closure on the open end of the container to enclose the plates therein and form the battery cell.

In accordance with the method of the invention, assembling a battery cell comprises the steps of supplying generally rectangular negative and positive battery plates in alternate succession to a plate packaging station, each plate having a conductive lug extending from one side thereof, and packaging each plate in a separator material with the plate lug extending outwardly of the material. Also included are the steps of placing the packaged plates side by side in an open ended container to alternate plates of negative and positive polarity and to position the plate lugs toward the open end of the container, electrically connecting the lugs of the negative plates in parallel and the lugs of the positive plates in parallel, and placing a closure on the open end of the container to enclose the plates therein and form the battery cell.

The foregoing and other objects, advantages and features of the invention will become apparent upon a consideration of the following detailed description, when taken in conjunction with the accompanying drawings.

BRIEF DESCRIPTION OF THE DRAWINGS

FIG. 1 is a side elevation view of a preferred embodiment of a portion of the battery cell assembly system of the invention, for packaging battery plates in pouches of separator material;

FIG. 2 is a top plan view taken substantially along the lines 2—2 of FIG. 1, and shows additional portions of the battery cell assembly system for manufacturing the packaged plates into a battery cell;

FIG. 3 is a side elevation view taken substantially along the lines 3—3 of FIG. 2, and shows a structure for alternately conveying negative and positive battery plates from stacks thereof to a conveyor for being transported to a packaging station, and FIG. 4 is a cross sectional side elevation view, taken substantially along the lines 4—4 of FIG. 2, showing a structure for conveying empty containers to a loading station whereat a plurality of interleaved positive and negative packaged battery plates are placed in the containers.

DETAILED DESCRIPTION

The drawings illustrate a battery cell assembly system constructed in accordance with a preferred embodiment of the invention. The system includes means for packaging positive and negative battery plates within pouches of a separator material, and for then interleaving the plates side by side in a battery cell container to alternate negative and positive plates. After the plates are in the container, lugs at the ends of the plates are electrically joined to connect the positive plates in parallel and the negative plates in parallel, and conductive battery posts are formed on the cell in connection with the interconnected lugs. To complete the cell, a cover is placed over and sealed with the container, with the posts extending upwardly through the cover, and electrolyte is added to the cell to surround the plates. The process by which the cell is assembled is completely automatic, thereby facilitating economical and rapid assembly of battery cells.

Referring to FIGS. 1-3, the battery cell assembly system includes a battery plate transporter, indicated generally at 20, located at one end of a conveyor 22. The transporter has a pair of vacuum operated double pickups 24 and 26, mounted for horizontal movement on a rod 28 and for vertical movement on a column 30. The vacuum pickups 24 and 26 are on opposite sides of the conveyor, and in the manufacture of a battery cell alternately lift and convey battery plates 32 and 34 from stacks thereof to the conveyor. The battery plates 32 and 34 are of opposite polarity, for example the plates 32 are of negative polarity and the plates 34 are of positive polarity, so that in the manufacture of a battery cell plates of alternate polarity are deposited on and moved by the conveyor. Obviously, any suitable motor means may be used to impart horizontal and vertical movement to the vacuum pickups 24 and 26, such for example as electromechanical means or hydraulic means, the particular motor means selected not being relevant to the present invention.

Where the battery plates are of a type which may advantageously be used in a lead-acid storage battery, each plate 32 and 34 usually comprises a generally rectangular grid or frame which may be of lead, and has a laterally projecting lead lug on its periphery by means of which a plurality of grids of similar polarity may be fused together or otherwise electrically connected in parallel as by a bar leading to a battery post. In the manufacture of the grid into a battery plate, the surface of the grid is provided with a paste of lead oxide containing some sulphuric acid. A plurality of such grids are then heated and dried to solidify the paste, and are later subjected to an electrical charge while in sulphuric acid, whereby the group of negative plates 32 have their lead oxide converted to lead, and the group of positive plates 34 have their lead oxide converted to lead dioxide. In use of the plates to form a battery cell, a series of plates are placed side by side in a cell to alternate negative and positive plates, and a cell may comprise any number of plates, with the positive plates being connected in parallel and with the negative plates being connected in parallel, so that the entire cell has a desired amperage rating. Depending upon the required voltage for the battery, a requisite number of cells are connected in series within a housing for the battery, and the housing filled with an electrolyte solution.

As is well known, in use of battery plates, especially storage battery plates of the lead-acid type, it has been found that the active paste material of lead or lead dioxide more or less readily disintegrates and tends to fall from the plates to accumulate in the bottom of the cell, and electrode dendrites tend to grow between adjacent plates. It has furthermore been found that if the plate is wrapped or encapsulated within a separator material properly constructed from a substance permeable to the electrolyte and which does not interfere with the traverse of ions between the plates, the active material may be retained mechanically in position on the plate while the electrochemical action of the battery is unimpeded. Consequently, battery plates for batteries of the storage type are customarily encased in separator material.

Accordingly, the system of the invention includes a packaging station, indicated generally at 36, whereat the battery plates 32 and 34 are packaged within pouches of separator material, which preferably are of the type disclosed in U.S. Pat. No. 4,215,186, issued to Ben E. Jaeger on July 29, 1980, the teachings of which are incorporated herein by reference. As disclosed in that patent, the separator material is a filter media material comprised of a thermoplastic needled polypropylene fabric, which is highly effective in retaining the active material or paste on a battery plate, prevents the formation of electrode dendrites between the plates, and yet enables free passage of electrolyte ions between the plates for efficient operation of a battery. In addition, the separator material is readily formed into battery plate packages, and results in minimum thickness dimensions of packaged plates so that increased numbers of plates may be contained in a battery of given size for an increased capacity of the battery. Also, the needled polypropylene fabric separator material is thermoplastic, whereby the same may efficiently be heat severed and heat sealed in the formation of battery plate separators.

The packaging station 36 is located at an opposite or delivery end of the conveyor 22, and includes a supply roll 38 of polypropylene separator material. A leading end 40 of the separator material extends between a pair of feed rolls 42 and guillotine shears 44, and in the packaging of battery plates is moved by the feed rolls between the shears and into a hopper or trough 46 extending downwardly from the delivery end of the conveyor. The arrangement is such that a length of separator material extending from within the hopper to between the shears is proper for packaging a battery plate, with the length within the hopper being approximately one half of the overall length.

Packaging the battery plate within the sheet of separator material occurs substantially automatically as a function of movement of the plate along the conveyor 22. Assume, for example, that a plate 32 is moving along the conveyor, and the forward end of the plate is about to move over the end of the conveyor. At this time, the feed rolls 42 will have advanced a length of separator material 40 between the shears 44 and into the hopper 46, at which point the material will be extended in a generally vertical plane. With continued movement of the battery plate by the conveyor, a forward end of the plate (the bottom side of the plate when mounted in a battery cell) engages the separator material midway along its length between the guillotine shear and the end within the hopper, and moves the same to between a pair of folding rolls 48 mounted immediately beyond the upper end of the hopper which, with continued movement of the battery plate, fold the separator material around the plate. To this end, upon contact of the sheet material with the end of the plate and movement of the same to between the folding rolls, the guillotine shears are operated to sever the length of separator material for being folded around the plate.

The folding rolls 48 are between the conveyor 22 and a conveyor 50, so that as the battery plate 32 moves from between the folding rolls it is received on the conveyor 50. The polypropylene separator material is thermoplastic and, to conveniently and economically form the same into a pouch for the battery plate, heated rolls 52 are mounted in opposition on opposite sides of the leading end of the conveyor 50 to engage and heat seal together opposite side edges of the material as the plate and material move therepast on the conveyor 50. Side trim rolls 54 are mounted in opposition on opposite sides of the conveyor 50 beyond the heated rolls 52 for trimming by heat or shearing forces excess side edges from the separator material outwardly from the heat sealed portions thereof, whereafter a stop plate 56 arrests further movement of the packaged battery plate along the conveyor at a position whereat the open upper end of the separator material pouch is between end heat seal bars 58, which then move together to complete the encapsulation of the battery plate in the pouch of separator material.

As best shown in FIG. 2, a lug 60 extends from each battery plate 32 and 34, by means of which battery plates of like polarity may be electrically connected in parallel in a battery cell. The lug extends through the open upper end of a pouch of separator material prior to the time the end is closed by the end heat seal bars 58, and for the purpose of accommodating the lugs the end heat seal bars are arranged to close only the center portions of the end of the pouch.

A clamshell pickup 62 at the delivery end of the conveyor 50 is actuated by any suitable mechanism 64, and is mounted for horizontal movement along a rod 66 and vertical movement along a column 68 by any suitable motor means. The arrangement is such that the clamshell pickup removes packaged battery plates from the conveyor 50, after the same have been end sealed by the heat seal bars 58, and carries the plates to a support (not shown) on which sequential ones of the plates are placed side by side and one on top of another in a stack indicated generally at 70. When complete, the stack includes all of the plates that are to be in a battery cell, and since plates of opposite polarity are alternately moved along the conveyors 22 and 50 in the manufacture of any one battery cell, the plates of one polarity in the stack are interleaved with plates of the other polarity, thereby to alternate the polarity of the plates. A typical battery cell may contain 13 plates, in which case negative plates would ordinarily be on the outside of the cell, so that there would be seven negative and six positive plates in a completed stack. Obviously, the battery plate transporter 20 may be operated in any appropriate manner to position a desired sequence of negative and positive plates on the conveyor 22 which, when packaged and stacked, form a particular battery cell configuration.

Upon completion of a stack 70 of packaged battery plates for a cell, the stack of plates is inserted into a container 72. To this end, and with reference also to FIG. 4, a plurality of empty containers 72 are maintained in a supply hopper 74, and are gravity fed to a position whereat a plunger 76 of a container feed cylinder 78 sequentially engages the lowermost container and moves the same to beneath a conveyor 80 having a plurality of container engaging plates 82 extending outwardly therefrom at spaced intervals therearound. The arrangement is such that as each container is engaged by a container engaging plate 82, it is moved through a trackway defined between the conveyor and a guide plate 84 to a location atop the conveyor whereat an open end 86 of the container is toward and in alignment with the stack of packaged battery plates. A cylinder 87 is then actuated so that its plunger 88 pushes or slides the stack of plates off of the support and into the container through the open end thereof. To this end, the orientation of the stack of plates is such that when the stack is moved into the container the lugs 60 on the plates are toward the open end of the container.

With the stack 70 of packaged battery plates within the container 72, the conveyor 80 is operated to move the next succeeding empty container into position for receiving the next to be formed stack of plates, and to move the loaded container to a position whereat a lower (side) surface of the container is engaged by a vacuum lift device 90 having a pair of vacuum operated pickups 92. The lift device elevates the filled container while holding the battery plates therein by any suitable means, for example by extending a retaining rod (not shown) across the ends of the plates at the container opening, rotates it 90° and places it open end down on a post and lug conductor cast on mold 94. The cast on mold receives therein a supply of molten lead, and casts the lead into a pair of conductors which electrically connect the negative plates in parallel and the positive plates in parallel by means of the lugs, and forms a pair of posts, each of which connects with a separate one of the conductors.

After the conductors and posts cast onto the plates by the mold 94 have sufficiently cooled, a turn over device 96, having a vacuum pickup 98 on an end of a piston rod of a cylinder 100, is operated to the position shown in dashed lines whereat the pickup adheres to a side area of the container 72 on the cast on mold. The device is then operated to the position shown in solid lines to rotate the container and plates through 180 degrees, while holding the battery plates therein by any suitable means, for example by extending a retaining rod (not shown) across the ends of the plates at the container opening, so that the container is open side up at a capping station, indicated generally at 102.

At the capping station 102 a cover 104 is placed over and sealed with the open upper end 86 of the container 72 to enclose the packaged battery plates in the container. In this connection, the cover has a pair of passages 106 through which the posts formed during the casting operation extend, and a removable cap 108 by means of which electrolyte may be introduced into the battery cell. Although any suitable electrolyte resistant materials may be used for the container 72 and cover 104, and any suitable means may be employed for adhering the cover on the container, for greatest convenience and economy the container and cover are of a thermoplastics material, and an electrically heated cover seal unit 110 at the capping station grips the cover, places it on the container about the open end and heat seals the cover to container. In this connection, the heat seal unit is mounted for vertical reciprocation on a column 112 for movement toward and away from the open end of a container, and if desired may be mounted for horizontal movement to position the cover over the container whereat the same is shown in solid lines as supported by the pickup 98. On the other hand, the heat seal unit may be mounted only for vertical movement, and the cylinder 100 used to move the container to a position beneath the heat seal unit for having the cover placed thereon.

While one embodiment of the invention has been described in detail, various modifications and other embodiments thereof may be devised by one skilled in the art without departing from the spirit and scope of the invention, as defined in the appended claims.

What is claimed is:

1. A system for assembling battery cells, comprising means for supplying generally rectangular negative and positive battery plates in alternate succession to a plate packaging station, each plate having a conductive lug extending from a side thereof, said means for supplying negative and positive plates to the packaging station comprising conveyor means and vacuum pickup means for alternately placing negative and positive plates from stacks thereof on said conveyor means for being transported to the packaging station; means at the packaging station for packaging each plate in separator material with the plate lug extending outwardly of the material, said means for packaging comprising means for extending a generally rectangular sheet of thermoplastic separator material across the path of travel of the plate on said conveyor means, so that a leading side edge of the plate engages one side of the sheet centrally thereof and deflects the sheet, folding rolls on an opposite side of the sheet centrally thereof for receiving the sheet and the plate between a nip thereof as the sheet is deflected by the plate and the plate is transported by said conveyor means, and for folding the sheet around the plate, said edge heat seal means along the path of travel of the plate and sheet beyond said folding rolls for heat sealing together the side edges of the separator material which are adjacent the fold to form a pouch of separator material around the plate, the plate being oriented so that the lug thereof extends through an open end of the pouch opposite from the fold, side edge trim means along the path of travel of the plate and sheet beyond said side edge heat seal means for trimming excess material from the side edges of the sheet outwardly of the heat sealed portions, and another side edge heat seal means for sealing the central portion of the open end of the pouch opposite from the fold to secure the plate in the pouch but to enable the plate lug to extend therefrom; means for placing a plurality of the packaged plates side by side in an open ended container to alternate plates of negative and positive polarity and to position the plate lugs toward the open end of the container, said means for placing the packaged plates in an open ended container comprising clamshell pickup means for removing the packaged plates from said conveyor means and for placing the packaged plates in a stack to alternate plates of positive and negative polarity, second conveyor means for transporting the container in horizontal position into alignment with the stack, such that bottom ends of the plates opposite from the lugs are aligned with the open end of the container, and piston means for pushing the stack of plates into the container such that the stack enters the container bottom end first through the open end of the container; means for electrically connecting the lugs of the negative plates in parallel and the lugs of the positive plates in parallel, said means for electrically connecting comprising second vacuum pickup means for transporting the container with battery plates therein to a casting station and, at said casting station, means for casting a first lead conductor across the lugs of all of the negative plates to connect the negative plates in parallel and a second lead conductor across the lugs of all of the positive plates to connect the positive plates in parallel when the plates are in the container, said means for casting including means for casting a pair of conductive lead posts, one each in electrical contact with each of the conductors; and means for placing a closure on the open end of the container to enclose the plates therein, wherein the container and the closure are of a thermoplastic material, and wherein said means for placing a closure on the container includes third vacuum pickup means for transporting the container with battery plates therein from said coating station to a container closing station, and means at said closing station for placing the closure over the open end of the container and for heat sealing the closure thereto, the closure having a pair of passages therethrough and said placing means placing the closure over the open end of the container to extend the posts through respective ones of the passages prior to heat sealing the closure on the container.

* * * * *